May 31, 1927.  
S. MORELLI  
ANIMAL TRAP  
Filed Dec. 24, 1926

Inventor
S. Morelli
By Philip A. H. Jewell
Attorney

Patented May 31, 1927.

1,630,798

UNITED STATES PATENT OFFICE.

SAM MORELLI, OF GASTON, OREGON.

ANIMAL TRAP.

Application filed December 24, 1926. Serial No. 156,874.

The invention relates to animal traps, and has for its object to provide a device of this character comprising a casing disposed on an incline and having an entrance passage in one side thereof, and a gravity propelled disc closure within the casing and released by the animals after entering the chamber of the casing, and which closure rolls by gravity to a position where it will form a closure for the entrance passage.

A further object is to provide one side of the casing with spaced walls between which the disc shaped closure is disposed, and which walls guide the disc closure as it rolls to a position adjacent the entrance passage. Also to provide a bait carrying pin extending loosely through an aperture in the inner wall and into a recess in one side of the disc and forming means for normally holding the disc in open position, and for releasing the disc when the animal nibbles the bait.

A further object is to provide the under side of the casing with an auxiliary chamber separated from the main chamber by a screen and in which auxiliary chamber bait may be placed, thereby providing means for a permanent bait for the trap.

A further object is to provide all of the vertically disposed walls with transversely disposed registering apertures, which apertures admit light to the bait compartment, and at the same time allow an animal on the outside of the trap to smell the bait and easily locate the same.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
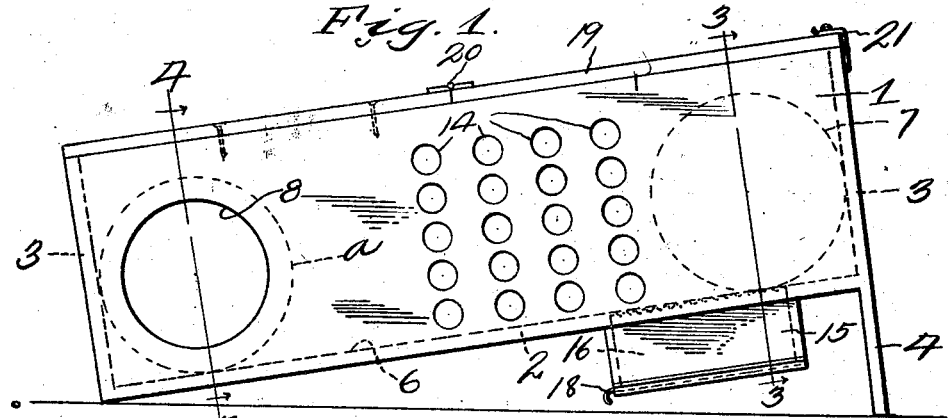
Figure 1 is a side elevation of the trap.
Figure 2:
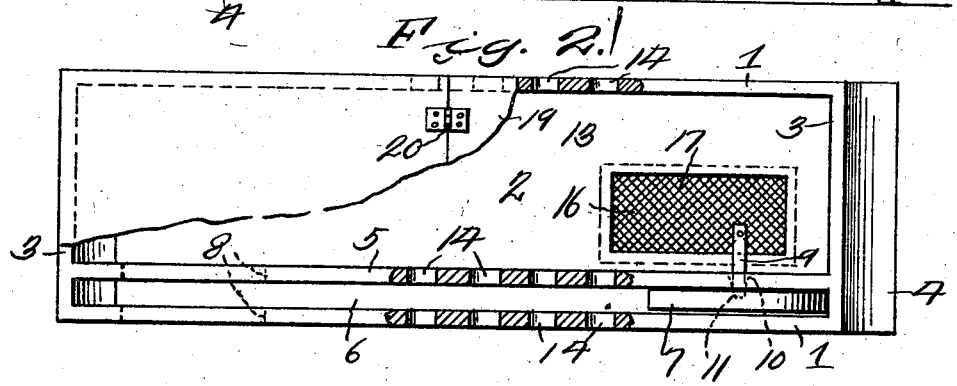
Figure 2 is a top plan view of the trap showing parts broken away to better show the structure.
Figures 3, 4:
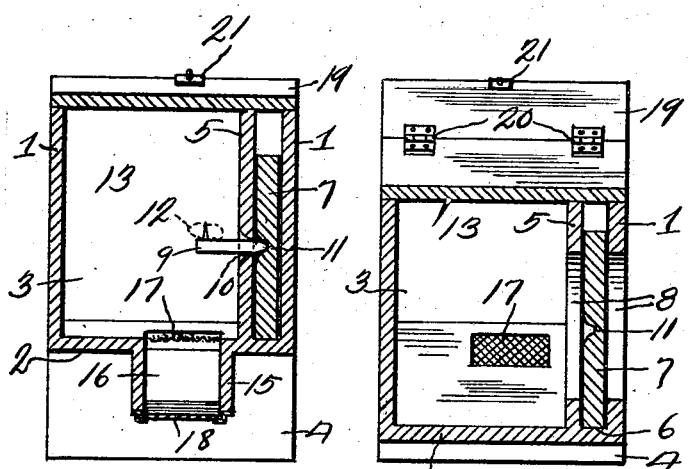
Figure 3 is a transverse sectional view through the trap taken on line 3—3 of Figure 1.
Figure 4 is a transverse sectional view taken on line 4—4 of Figure 1.

Referring to the drawing, the numeral 1 designates the side walls of the trap, 2 the inclined bottom and 3 the end walls. It will be noted that the trap body as a whole is oblong shaped and inclines upwardly from its lower end, and has its high end supported by the ground engaging member 4. Disposed within the trap body in spaced relation to one of the walls 1 is a vertically disposed wall 5, which forms with the wall 1 and inclined bottom 2 an inclined guide way 6 down which the disc shaped closure 7 moves, and is gravitationally propelled to the dotted line position $a$ shown in Figure 1 where it will form a closure for the registering entrance openings 8 in the walls 1 and 5. The disc 7 is normally held in the positions shown in Figures 1 and 2 by means of a pin 9, which pin extends through an enlarged aperture 10 in the wall 5, and loosely into a recess 11 in the inner side of the disc 7, therefore it will be seen that when the animal nibbles at the bait 12, carried by the pin 9, said pin will be easily dislodged, thereby releasing the disc closure 7, and allowing said disc closure to be gravitationally propelled down the inclined guide 6 to closed position as shown in Figure 1, and into engagement with the lower end wall 3, which will limit the movement of the disc closure and trap the rat or other animal within the chamber 13 of the trap.

Walls 1 and 5 are provided with registering apertures 14 which admit light to the chamber 13, allowing the animal to easily locate the bait on the pin 9, and at the same time said apertures allow the animal to easily smell the bait when outside the trap, and to seek the entrance passage 8 and enter the trap.

Extending downwardly from the bottom of the body of the trap is an auxiliary casing 15, in the chamber 16 of which bait may be placed, and the bait can be located by the animal for attracting him to a point adjacent the pin 9, as the screen 17 is provided. A permanent bait may be placed in the chamber 16 if desired and access may be had to the chamber 16 by removing the slide closure 18, and if desired the bait 12 may be eliminated, and the closure may be released by the animal coming into engagement with the pin in its effort to get to the bait within the chamber 16. The upper side of the trap is provided with a hinged closure 19 hingedly mounted at 20, and which closure is held in closed position by a conventional form of closure fastener 21, and when it is desired to remove the animal from the trap, the closure 19 is opened.

From the above it will be seen that an animal trap is provided which is simple in construction, and provided with a gravitationally propelled closure, which closure is released by the animal when at a remote position in relation to the entrance, thereby insuring the entrance of the animal into the trap and to a position remote to the entrance, consequently insuring the trapping of the animal. It will also be seen that the trap is simple in construction, the parts reduced to a minimum, and the use of springs, which soon lose their tension, are eliminated.

The invention having been set forth what is claimed as new and useful is:—

1. A trap comprising a casing having side walls, an inclined bottom, an entrance passage in one of the side walls adjacent the lower end of the inclined bottom, an inclined track way adjacent the entrance passage side of the casing, and a gravitationally propelled round disc closure mounted on said trackway and forming means for closing the trap after an animal enters the same.

2. A trap comprising a casing, side walls, end walls, an inclined bottom, a gravitationally propelled round closure mounted on said bottom and forming a closure for an entrance passage, means for holding said round closure in open position, said means also forming animal controlled means for releasing said closure.

3. The combination with an animal trap comprising a casing having an entrance passage, side walls carried by said casing, an inclined bottom, of a spaced wall extending upwardly from said bottom adjacent one of the side walls, and through which the entrance passage extends, a round disc closure mounted between said spaced wall and adjacent side wall and adapted to be gravitationally propelled to a position between the entrance passages, means for maintaining said closure in open position, said means comprising a pin extending through an aperture in one of the walls and into a recess in the adjacent side of the disc.

4. A trap comprising a casing having an inclined bottom and an entrance passage, a gravity propelled round disc closure for said passage, means for holding said disc closure in open position at a point remote to the entrance passage and animal control releasing means remote to the entrance passage.

5. A trap comprising a casing having an entrance passage, an animal controlled gravitationally propelled round closure for said passage, an inclined bottom carried by said casing, an auxiliary casing extending downwardly from the inclined bottom, a screen member carried by the auxiliary casing and separating the chamber thereof from the main casing, and a closure for the under side of the auxiliary casing.

In testimony whereof I hereunto affix my signature.

SAM MORELLI.